July 7, 1936. J. LIST 2,046,903
PISTON AND CONNECTING ROD
Filed Dec. 31, 1934
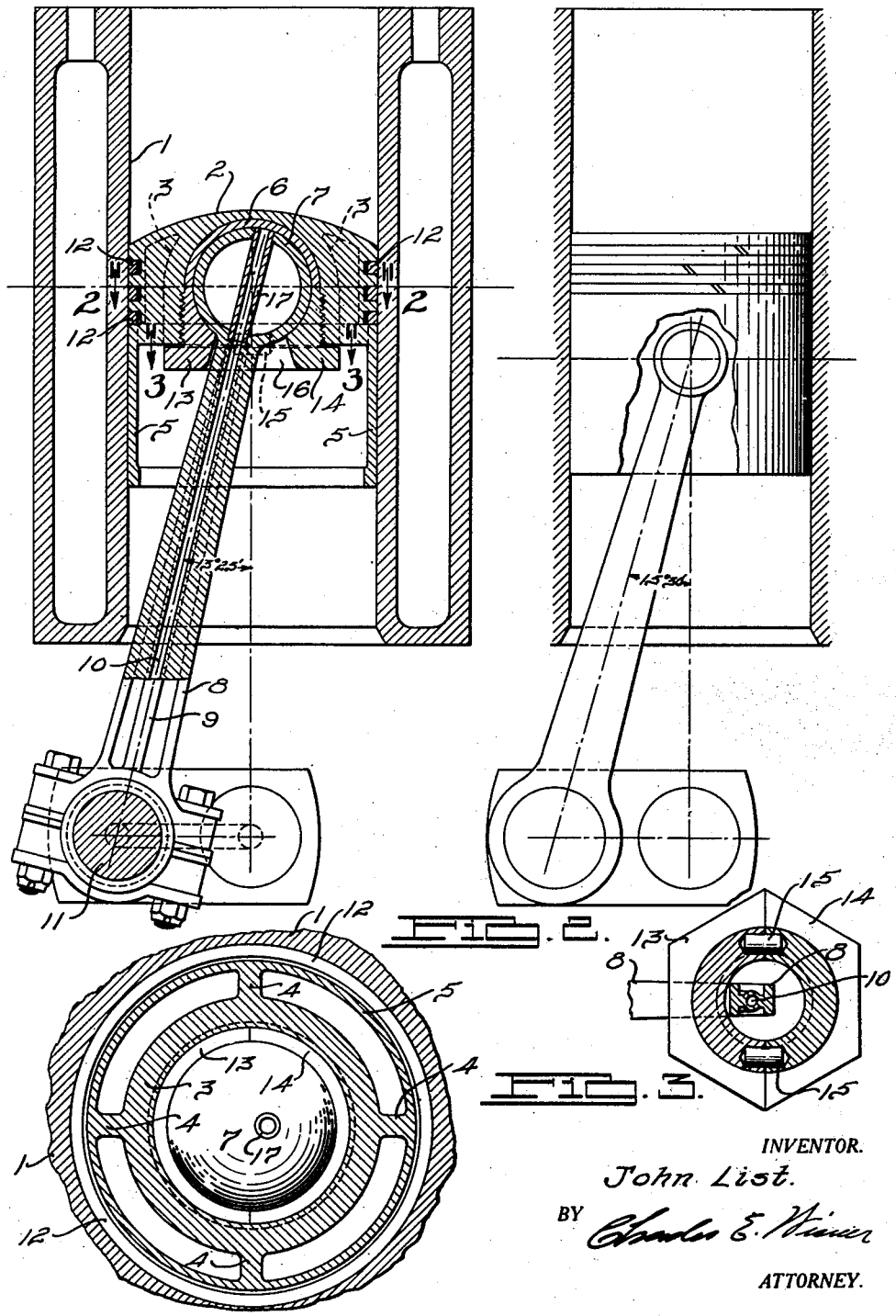
INVENTOR.
John List.
BY Charles E. Hunier
ATTORNEY.

Patented July 7, 1936

2,046,903

UNITED STATES PATENT OFFICE 2,046,903

PISTON AND CONNECTING ROD

John List, Mount Pleasant, Mich.

Application December 31, 1934, Serial No. 759,961

7 Claims. (Cl. 309—6)

This invention relates to pistons and connecting rods and the object of the invention is to provide a piston and connecting rod in which the connecting rod is formed with a ball at the upper end fitting in the piston and arranged so that the piston and connecting rod may have a universal movement.

Another object of the invention is to provide a connecting rod having a hollow ball end for lightness and provided with a means for lubricating the socket in which the ball is turnable.

Another object of the invention is to provide a connecting rod on which the piston may turn to prevent uneven wear on the sides of the piston due to the thrust of the connecting rod.

A further object of the invention is to provide a means for shortening the height of the usual internal combustion engine by connecting the upper end of the connecting rod near the top of the piston, the arrangement allowing the crank shaft to be mounted nearer the bottom of the cylinder.

These objects and the several novel features of the invention are hereinafter more fully described and claimed and the preferred form of construction by which these objects are attained is shown in the accompanying drawing in which—

Fig. 1 is a section through a piston and connecting rod embodying my invention as mounted in a cylinder.

Fig. 2 is an enlarged section taken on line 2—2 of Fig. 1.

Fig. 3 is a section taken on line 3—3 of Fig. 1.

A cylinder 1 is shown in Fig. 1 in which a piston 2 is reciprocably mounted. This piston 2 as shown in Fig. 2 is provided with a central portion 3 connected by ribs 4 with the outer or skirt portion 5 of the piston. The portion 3 is provided with a semi-spherical recess in which a semi-spherical bronze lining 6 is cast in place. The connecting rod is formed at the upper end with an integral hollow ball 7 and this connecting rod 8 is provided with a thickened portion 9 at the center having an oil conduit 10 therethrough, shown in Figs. 1 and 3. The connecting rod 8 at the lower end is connected to the crank shaft 11 in the usual manner as will be understood from Fig. 1. The piston is provided with piston rings 12 as shown and a nut is threaded into the portion 3 of the piston to hold the ball end 7 of the connecting rod in place. This nut is formed from two halves 13 and 14. The companion faces of the two portions 13 and 14 are provided with apertures for the dowel pins 15 which are preferably a press fit in one of the nut portions and are arranged to be engaged in the corresponding aperture of the other nut portion to align the two nut portions so that the threads thereon come to alignment when the parts are assembled as shown in Fig. 3. These nut portions 13 and 14 are formed of bronze with semi-spherical faces and when threaded into the portion 3 of the piston these faces act to hold the ball end 7 of the connecting rod in place and provide a bearing for said ball end.

The nut portions 13 and 14 allow the nut to be assembled about the shank of the connecting rod 8 before being threaded into place and the nut portions are also provided with an enlarged opening 16 to allow clearance for the connecting rod. As shown in Fig. 1, an aperture is provided in the ball 7 for the steel tube 17 and a recess is provided diametrically opposite about the oil conduit 10 for the lower end of the tube. This steel tube 17 is a drive fit in the aperture and the recess in the ball and the lower end of the oil conduit 10 is open to the bearing face of the crank shaft 11. This arrangement allows the oil under pressure to flow upwardly through the oil conduit 10 and through the tube 17 and the oil will pass from the upper end of the tube 17 to lubricate the inner surface of the bronze ball socket. By the arrangement shown, the ball 7 is connected close to the top of the piston so that the maximum angle of the connecting rod will only be 13° 25' as compared to a 15° 30' angle for the normal connecting rod shown in Fig. 4. This allows the crank shaft to be set nearer the bottom of the cylinder without decreasing the stroke and also reduces the over all height of the engine. Also with this arrangement the piston is free to revolve on the upper end of the connecting rod so as to prevent the piston and cylinder from wearing out of round due to the thrust imposed by the connecting rod. Also by connecting the connecting rod close to the top of the piston, the over all height of the engine is further reduced and, at the same time, the ball socket is properly lubricated to allow the piston to freely turn on the connecting rod.

By providing the steel tube 17 in the hollow ball end 7 of the connecting rod, the oil is conducted through the hollow ball end for lubrication and, at the same time, the hollow ball cannot fill with oil to increase its weight. Due to the fact that the ball end 7 is hollow, the weight of the connecting rod is reduced.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a piston and connecting rod, a piston provided with a socket adjacent the upper end thereof, a semi-spherical bronze lining in said socket, a connecting rod having a crank shaft bearing at the lower end, a hollow ball formed integrally with the upper end of the connecting rod, the hollow ball seating in the bronze socket lining, the connecting rod being provided with an oil conduit leading from the crank shaft bearing of the connecting rod to the interior of the hollow ball, a tube fitted tightly into the hollow ball and extending diametrically therethrough, the tube being open to the oil conduit at one end and being open to the bronze socket lining at the opposite end and preventing introduction of lubricant into the ball, a threaded nut comprising two semi-circular halves, dowel pins carried by said nut halves and connecting said halves together with the threads in alignment, the assembled nut being threaded into the upper end of the piston and being provided with semi-spherical faces engaging the periphery of said hollow ball.

2. In a piston and connecting rod, a piston provided with a socket in the head thereof, a semi-spherical bronze lining in said socket, a connecting rod, a hollow ball end formed integrally with the upper end of the connecting rod and seating in the bronze socket lining, the connecting rod having a lubricant conduit opening to the ball end, said ball end having an aperture diametrically opposite the opening of the conduit thereto, a tube seated in the interior of the ball in alignment with the conduit and extending into the said opening at the opposite end thereby sealing the hollow ball to a flow of oil from the conduit, a threaded nut comprising two semi-circular halves, dowel pins carried by said nut halves and the nut halves being assembled together about the shank of a connecting rod, the dowel pins connecting the nut halves together with the threads thereon in alignment, the assembled nut being threaded into the upper end of the piston and being provided with semi-spherical faces engaging the ball end of said connecting rod.

3. In a piston and connecting rod, a piston provided with a socket, a connecting rod, a hollow ball end formed integrally with the connecting rod, a tube extending diametrically through the hollow ball end, the connecting rod being provided with an oil conduit opening into one end of the tube, the upper end of the tube opening through the periphery of the ball, said tube preventing flow of oil into the ball, a nut formed of two halves threaded into the piston, means for connecting the halves of the nut to maintain the threads of the respective halves in alignment, the assembled nut being provided with a semi-spherical portion engaging the hollow ball end and retaining said end and preventing a flow of oil into the ball in the piston socket.

4. In a piston and connecting rod, a piston provided with a socket, a connecting rod, a hollow ball formed integrally with the upper end of the connecting rod, the hollow ball seating in the socket of the piston, a split nut threaded into the piston and retaining the hollow ball in the socket, the connecting rod being provided with an oil conduit opening into the hollow ball, a tube extending through the hollow ball, the tube aligning with the oil conduit at one end and opening through the periphery of the ball at the opposite end and preventing a flow of oil into the ball.

5. In a piston and connecting rod, a piston provided with a socket, a connecting rod, a hollow ball provided at the upper end of the connecting rod, the hollow ball seating in the socket of the piston, a split nut threaded into the piston and retaining the hollow ball in the socket, the connecting rod being provided with an oil conduit opening into the hollow ball, a tube extending through the hollow ball, the tube aligning with the oil conduit at one end and opening through the periphery of the ball at the opposite end and preventing a flow of oil into the ball.

6. In a device of the character described, a piston provided with a socket, a connecting rod provided with a hollow ball end seating in the socket, the connecting rod being provided with an oil conduit opening into the hollow ball, a tube mounted in the hollow ball and opening through the periphery thereof, said tube connecting with the oil conduit and preventing passage of oil into the interior of the ball.

7. In a piston and connecting rod construction, a hollow piston having a cylindrical wall and a socket in the head formed by inwardly extending thin walls spaced from the piston wall, radial webs supporting said walls in respect to the cylindrical wall of the piston, the thickness of the wall between the outer face of the head and the socket being approximately the same thickness as the socket wall to provide for a minimum weight of the piston, a connecting rod having a crank end and a hollow ball at the opposite end seating in the socket, a retaining nut for supporting the same seated in the socket, the said socket and surface of the ball therein being sealed to the interior of the piston, means for lubricating the contacting surfaces of the socket and ball, comprising an oil conduit extending from the crank end of the piston and opening to the interior of the ball, the ball having an aperture through its wall diametrically opposite the conduit opening therein, and a tube having its inner end seated in the wall of the ball about the conduit opening and its opposite end seated in the said aperture and providing a means for conveying oil from the conduit to the said contacting surfaces of the ball and socket and preventing a flow of oil into the ball thereby maintaining minimum weight.

JOHN LIST.